(12) United States Patent
Ishii et al.

(10) Patent No.: US 7,281,883 B2
(45) Date of Patent: Oct. 16, 2007

(54) BALL END MILL

(75) Inventors: Satoshi Ishii, Tagajou (JP); Takeshi Watanabe, Ishinomaki (JP)

(73) Assignee: NS Tool Co., Ltd., Tokyo (JP)

( * ) Notice: Subject to any disclaimer, the term of this patent is extended or adjusted under 35 U.S.C. 154(b) by 390 days.

(21) Appl. No.: 10/690,654

(22) Filed: Oct. 21, 2003

(65) Prior Publication Data
US 2004/0081520 A1    Apr. 29, 2004

(30) Foreign Application Priority Data
Oct. 25, 2002    (JP)    ............... 2002-311218

(51) Int. Cl.
*B23C 5/10*    (2006.01)
(52) U.S. Cl. .............. 407/54; 407/42; 407/34
(58) Field of Classification Search ............... 407/54, 407/53, 34, 36, 42, 62, 63, 118, 119
See application file for complete search history.

(56) References Cited

U.S. PATENT DOCUMENTS

| | | | | |
|---|---|---|---|---|
| 4,280,774 | A | * | 7/1981 | Hayama ................. 407/36 |
| 4,934,881 | A | * | 6/1990 | Tsujimura et al. ......... 407/42 |
| 6,152,657 | A | * | 11/2000 | Packer et al. ............. 407/32 |
| 6,174,111 | B1 | * | 1/2001 | Anjanappa et al. ........ 408/1 R |

FOREIGN PATENT DOCUMENTS

| | | |
|---|---|---|
| DE | 4324869 | 7/1993 |
| DE | 9319374 | 12/1993 |
| EP | 1125667 | 2/2001 |
| GB | 2082102 | 8/1981 |
| JP | 59-102510 | 6/1984 |
| JP | 9-267211 | 10/1997 |
| JP | 2000-052128 | 2/2000 |
| JP | 2002052412 | 2/2002 |

OTHER PUBLICATIONS

Japanese Office Action for JP2002-311218 dated Sep. 13, 2005 with English translation.
European Search Report for EP03256706, Feb. 2, 2004.

* cited by examiner

*Primary Examiner*—Willmon Fridie, Jr.
(74) *Attorney, Agent, or Firm*—Kolisch Hartwell, PC

(57) ABSTRACT

In a ball end mill, cutting can be carried out with high precision, and abrasion or breakage of the cutting blade can be reduced. The ball end mill is provided with a cutting blade section having a cutting blade, which is U-shaped in front view, at the end section of a shank. The cutting blade is provided on a flat surface deviated by a predetermined distance from the shank axis, and comprises blade faces having rake faces, which become negative angles at the time of cutting. In cross-section intersecting the cutting blade, all the blade faces have the same shape.

6 Claims, 4 Drawing Sheets

BALL END MILL

BACKGROUND OF THE INVENTION

1. Field of the Invention

This invention relates to a ball end mill.

2. Description of the Related Art

In recent years, there have been strong demands for higher precision die molding. In response, much research and development has been conducted in relation to more precise and longer-lived cutting tools. One of these, a ball end mill, performs extremely high-precision half-spherical cutting, and is needed in cutting of the curved surface, particularly in finishing processes.

A conventional ball end mill comprises two approximately quarter-circular cutting blades, which are provided opposite each other at the front tip along the diameter; the cutting blades touch at a point on a rotational axis of the end mill, or alternatively, they are given deviating rotational axes, so as to form a chisel section between the cutting blades near the rotational axis of the end mill.

In the ball end mill disclosed in Japanese Patent Application, First Publication No. 2002-52412, approximately circular cutting blades are provided continuously through the rotational axis at the tip of a tool main body, which rotates around the rotational axis; a rake face and a flank are provided continuously on both sides along each cutting blade, the rake face and the flank facing each other with the cutting blades therebetween. The rake angle and clearance angle change continuously on both faces on either side of the cutting blades.

However, the conventional ball end mill described above has problems such as the following.

In a ball end mill having two cutting blades touching at a point on the rotational axis, the contacting parts of the cutting blades have poor rigidity, making the cutting blades and the tool liable to break and shortening the life of the tool.

Providing a chisel section near the rotational axis reduces breakage of the cutting blades and the tool, however, since the cutting force in the chisel section is insufficient, the cutting blades move sideways and pressing against a work material. Consequently, tears and the like occur in the chisel section, making it impossible to obtain a smooth cutting surface having low surface roughness. As a result, this type of ball end mill has a drawback that it cannot be used in work requiring high precision, such as finishing.

In the end mill disclosed in the above Japanese patent application, the cutting blades are continuous, solving the problems mentioned above; however, since the circumferential speed of the cutting blades on the rotational axis is zero, the cutting resistance increases near the rotational axis, and as a result, abrasion of the cutting blades is severe, leading to breakage and shortening the life of the tool.

Furthermore, the ball end mill described in the above Japanese patent application has another drawback, namely, that the rake face and flank must be made into complex concaved surfaces, increasing the manufacturing cost. This work is particularly difficult when using highly rigid material which is essential for highly precise cutting, and makes the manufacturing cost extremely expensive.

SUMMARY OF THE INVENTION

The present invention has been achieved after consideration of the problems mentioned above, and provide a ball end mill capable of highly precise cutting, while reducing abrasion and breakage of the cutting blades.

In order to achieve the above objects, a first aspect of the ball end mill of this invention comprises an approximately semi-circular cutting blade at the tip of a tool main body, which rotates around a rotational axis; and a rake face and a flank, which are provided on either side of the cutting blade. The cutting blade deviates from the rotational axis by a predetermined distance.

According to this invention, since the cutting blade deviates from the rotational axis by the predetermined distance, any position on the cutting blade has a circumferential speed with respect to a work material. Consequently, cutting resistance decreases, and therefore, abrasion of the cutting blade is reduced and breakage of the cutting blade is prevented. Furthermore, since cutting residue near the rotational axis can be cut away by the movement of the tool, the workface is finished with high precision.

In addition, at the time of cutting, the cutting blade positions backward of the rotational axis in one rotational direction, and positions forward of the rotational axis it in the other. Therefore, the cutting blade acts as a type of cutting blades having edges at unequal interval, and resonance of the cutting blade is reduced and reduction of precision of the cutting surface due to resonance is prevented.

In a second aspect, in the ball end mill of the first aspect, the predetermined distance is between 0.5% and 10% of the outer diameter of the cutting blade.

According to this invention, the amount of abrasion is less than in a ball end mill having its cutting blade on the rotational axis, and the life of the tool is lengthened. According to test results, the range of the above distance where the amount of abrasion was the same or less as that in a ball end mill having its cutting blade on the rotational axis was between 0% to 12% of the outer diameter of the cutting blade, and when the distance was between 0.5% and 10%, the amount of abrasion is improved by approximately 20%. Here, the outer diameter of the cutting blade means the diameter of the circular section at the tip of the cutting blade.

In a third aspect of this invention, in the ball end mill described in the first and second aspects, blade faces are formed by the rake face and the flank which continue along either side of the cutting blade. Furthermore, the blade face on each side has predetermined angles of inclination when viewed from a cross-section perpendicularly intersecting the cutting blade, and these predetermined angles are different each other as the rake angles.

According to this invention, since the blade face is provided on either side of the cutting blade, and has predetermined angle when viewed from a cross-section which is perpendicularly intersecting the cutting blade, a rake angle when the blade face is provided as the rake face or a complementary angle of a clearance angle (right angle-clearance angle) when the blade face is provided as the flank, is equal predetermined angle within the blade face. In addition, since the predetermined angles of these blade faces are different, the cutting using two kinds of cutting blades with different rake angles is carried out. As a result, since the cutting resistance is different for each cutting blade, excitation force toward the cutting blade is asymmetrical to the rotational axis, and resonance is reduced more effectively.

In a fourth aspect of this invention, in the ball end mill as described in the first to third aspects, the rake angle of the rake face is a negative angle.

According to this invention, since the rake angle is negative, chips are compressed during cutting so that no burrs by the expansive stress are produced, and it possible to obtain a highly precise workface. Furthermore, since an angle of the cutting blade in cross-section intersecting the cutting blade and the rigidity of the tool are increased as a result of the rake angle is negative, and chamfer effect is also obtained; chipping during cutting and manufacture is prevented. Therefore, workability of the tool is improved and manufacturing cost of the tool is reduced.

In a fifth aspect of this invention, in the ball end mill as described in one of the first to fourth aspects, the cutting blade is slightly rounded by mirror polishing.

According to this invention, since the cutting blade is slightly rounded by the mirror polishing, breakage of the cutting blade is prevented, and the highly precise workface like a mirror corresponding to the polished cutting blade is obtained and extremely precise work can be performed.

In a sixth aspect of this invention, in the ball end mill as described in one of the first to fifth aspects, the cutting blade is provided on a flat surface parallel to the rotational axis.

According to this invention, the cutting blade can be easily manufactured to high precision. Therefore, it possible to manufacture the cutting blade inexpensively even when using very hard material, which is difficult to work on.

DETAILED DESCRIPTION OF THE PREFERRED EMBODIMENTS

A preferred embodiment of this invention will be described with reference to the accompanying drawings.

Figure 1A:
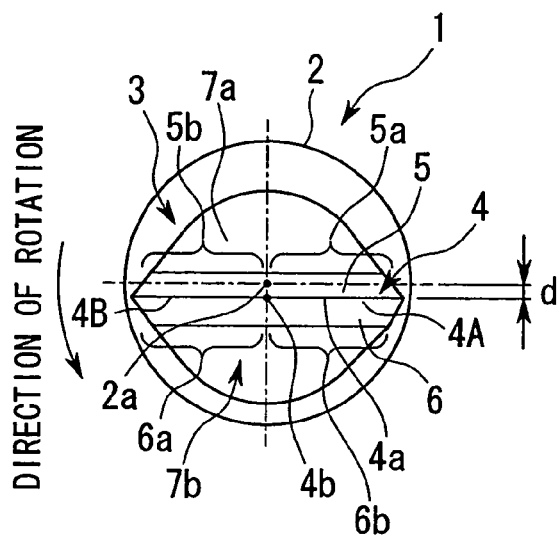
FIG. 1A shows a plan view of the ball end mill according to an embodiment of this invention.
Figure 1B:
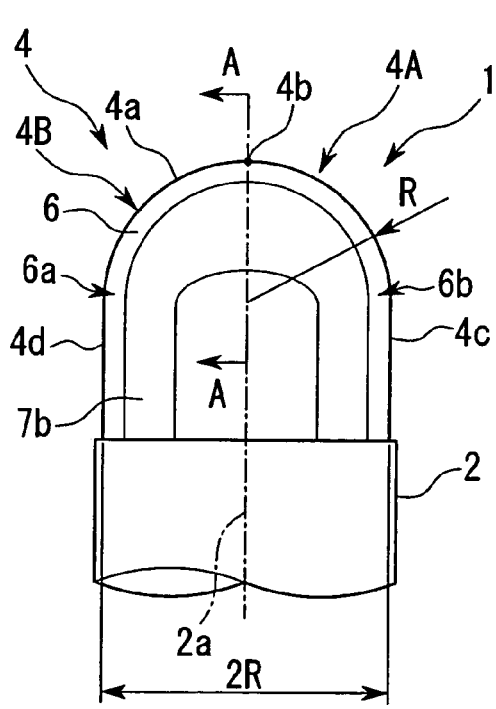
FIG. 1B shows a front view of the ball end mill according to an embodiment of this invention.
Figure 1C:
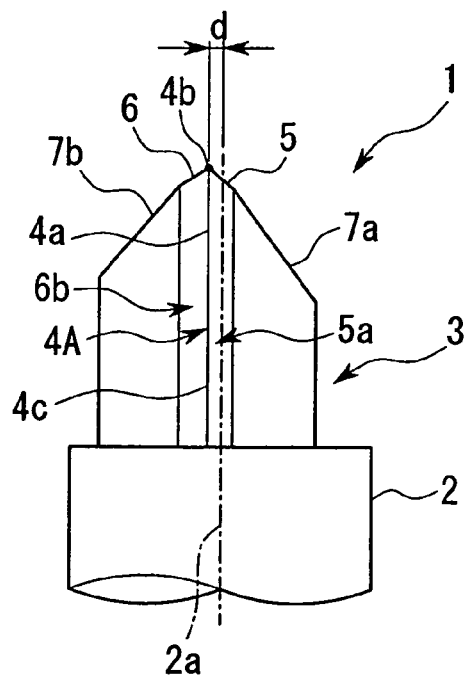
FIG. 1C shows a side view of the ball end mill according to an embodiment of this invention.
Figure 2A:
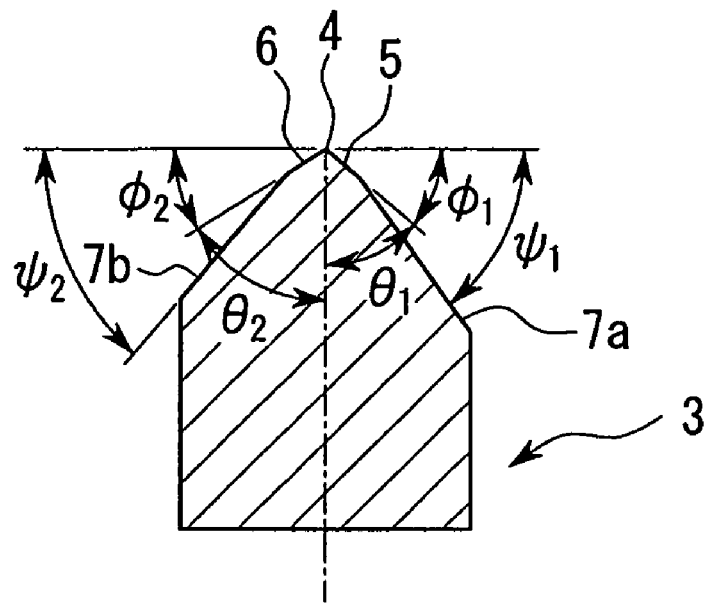
FIG. 2A shows a cross-sectional view taken along the line A-A of FIG. 1B.
Figure 2B:
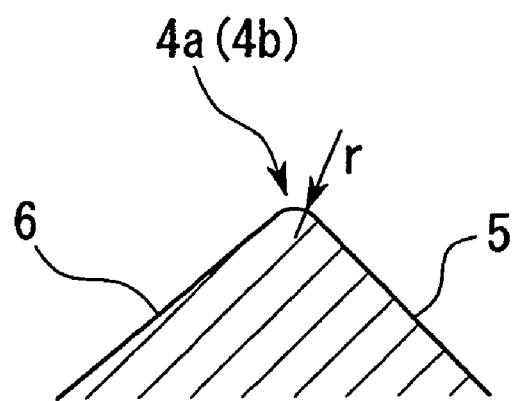
FIG. 2B shows a partially enlarged view of FIG. 2A.

FIGS. 1A, 1B, and 1C respectively show a plan view, a front view, and a side view, of a ball end mill according to an embodiment of this invention. FIG. 2A is a cross-sectional view taken along the line A-A of FIG. 1B, and FIG. 2B is an enlarged view of this section.

The ball end mill according to the embodiment of this invention basically comprises a shank (tool main body) 2 and a cutting blade section 3.

The shank 2 is a circle-headed column-like member having a predetermined circle diameter and a predetermined length, and a shank axis 2a which constitutes a central axis of the circle-headed column exactly matches a rotational axis of the ball end mill 1 at the time of cutting.

A cutting blade section 3 is installed at the end of the shank 2, and as shown in FIGS. 1B and 1C, its tip side has a semi-circular U-shape when viewed from the front, and its tip is mountain-shaped when view from the side. The U-shaped outer peripheral section of the cutting blade section 3 forms a cutting blade 4.

The cutting blade 4 is a straight blade which is provided on a flat tip end surface of the shank 2 so as to be parallel to the shank axis 2a at a predetermined distance d therefrom. The cutting-blade 4 is composed of a circular cutting blade 4a which has a radius R and outer peripheral blades 4c and 4d which is smoothly continued from the circular blade, and the outer peripheral blades 4c and 4d face each other with a width 2R between them. Incidentally, reference numeral 4b represents the peak of a circle which forms the circular cutting blade 4a.

The cutting blade 4 comprises a ridgeline which forms a mountain shape in cross-section perpendicular to the length of the cutting blade 4 itself by intersecting blade faces 5 and 6 at a predetermined angle. Furthermore, the cutting blade 4 comprising this ridgeline is slightly rounded by mirror polishing. The rounding amount (the degree of the mirror polishing) of the cutting blade 4 should preferably be between r=1 μm and 20 μm, where r represents the radius.

The blade face 5 is an inclined face provided on the side of the cutting blade 4 where the shank axis 2a is positioned. The blade face 6 is an inclined face provided on the opposite side of the cutting blade 4 to the shank axis 2a. Furthermore, in the cross-sectional line A-A which is perpendicularly intersecting the cutting blade 4, the angles of inclination of the blade faces 5 and 6 are predetermined respectively as shown in $\theta_1$ and $\theta_2$ in FIG. 2A when measured from a plane which is perpendicular to the shank axis 2a. In this embodiment, $0°<\theta_1<\theta_2<90°$, however, it is required only that $\theta_1$ and $\theta_2$ are different to ensure that there is a difference between the angles, and either may be larger than the other. Furthermore, angles $\phi_1$ and $\phi_2$ represent the complementary angles of the angles $\theta_1$ and $\theta_2$ respectively. That is, $\phi_1=(90°-\theta_1)$, and $\phi_2=(90°-\theta_2)$.

In this constitution, although the cutting blade 4 is continuous, it is convenient to think of it as comprising two sections divided by the peak 4b in FIG. 1A: a first cutting blade 4A, comprising the quarter-circular section on the right side of the circular cutting blade 4a as viewed in FIG. 1A, and the outer peripheral cutting blade 4c, and a second cutting blade 4B, comprising the quarter-circular section on the left side of the circular cutting blade 4a as viewed in FIG. 1A, and the outer peripheral cutting blade 4d.

The following explanation describes a case where the ball end mill 1 rotates with the shank axis 2a as its rotational axis, in the direction indicated by the arrow (counterclockwise) in FIG. 1A. In this case, since the first cutting blade 4A positions backward of the rotational axis, the blade faces 5 and 6 forming the first cutting blade 4A are termed rake face 5a (rake angle $\theta_1$) and flank 6b (clearance angle $\theta_2$). Similarly, since the second cutting blade 4B positions forward of the rotational axis, the blade faces 5 and 6 forming the second cutting blade 4B are termed flank 5b (clearance angle $\theta_1$) and rake face 6a (rake angle $\theta_2$).

The rake angles $\theta_1$ and $\theta_2$ should preferably be selected from the range defined by $10°\leq\theta_1\ (\theta_2)\leq60°$. For example, when $\theta_1=35°$ and $\theta_2=45°$ (an angle difference of 10°), then $\phi_1=55°$ and $\phi_2=45°$ (an angle difference of 10°). In this case, the cutting blade angle $(\theta_1+\theta_2)$ is 80°. In this way, since the rake angle is a negative angle, the cutting blade angle and the cross-sectional thickness of the cutting blade can be increased.

Therefore, the rigidity can be increased with respect to the bending along the cutting direction. In addition, at the time of manufacturing the cutting blade section 3, the large cutting blade angle produces a chamfer effect, which offers protection from chipping and increases workability.

Inclined surfaces 7a and 7b are provided on both sides of the blade faces 5 and 6, and the inclined surfaces 7a and 7b have angles Ψ1 and Ψ2 (where Ψ1>θ$_1$, and Ψ2>θ$_2$) by using the same measuring method as for the clearance angles. Consequently, at the time of manufacturing the blade faces 5 and 6, the inclined surfaces 7a and 7b can be made easily since they act as flanks when manufacturing the cutting blade section 3.

The cutting blade section 3 having the constitution described above may be manufactured from any type of material used in manufacturing cutting tools. For example, a hard metal, CBN (cubic boron nitride) sintered compact, and the like, can be suitably used. In particular, CBN sintered compact which has high abrasion resistance toward iron type materials are highly suitable for high-precision finishing in molding and the like.

One example of a specific manufacturing method of the cutting blade section 3 which can be used comprises steps of molding the substance described above into a sintered block having a schematic shape, of finishing the blade faces 5 and 6 by grinding, and of slightly rounding their intersecting ridgeline to a mirror-smooth face by polishing their intersecting ridgeline, thereby forming the cutting blade 4.

By using the constitution described above, the cutting blades 5 and 6 can be grind-finished by tilting a flat grinding tool to predetermined angles, which correspond to θ$_1$ and θ$_2$, and moving it along the U-shape of the cutting blade. This eliminates the need to work of the indented face of a gash and complex curved face, which are shown in the conventional ball end mill, and thereby enables the work to be carried out relatively easily, even when using material which is difficult to work on, such as CBN sintered material, and facilitates precise work.

Any method may be used to fix the cutting blade section 3 to the shank 2; for example, the cutting blade section 3 can be buried in the side of the shank 2.

Subsequently, the action of the ball end mill 1 will be explained.

Figure 3:
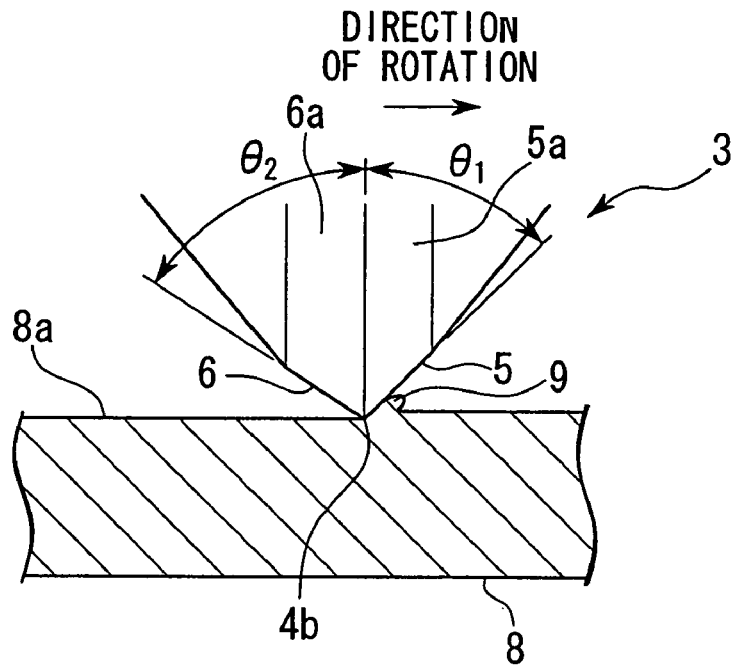
FIG. 3 is a schematic diagram showing a side view of the cutting state of the ball end mill according to an embodiment of this invention.
Figure 4A:
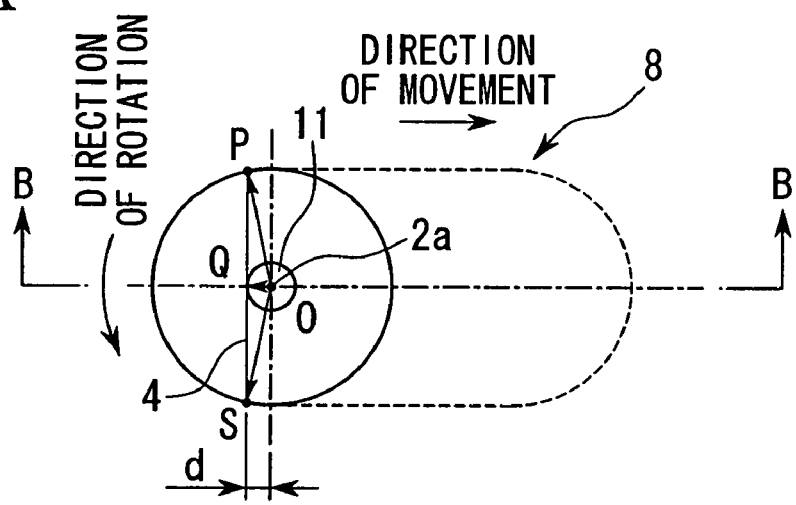
FIG. 4A shows a schematic plan view of the cutting state of the ball end mill of this invention.
Figure 4B:
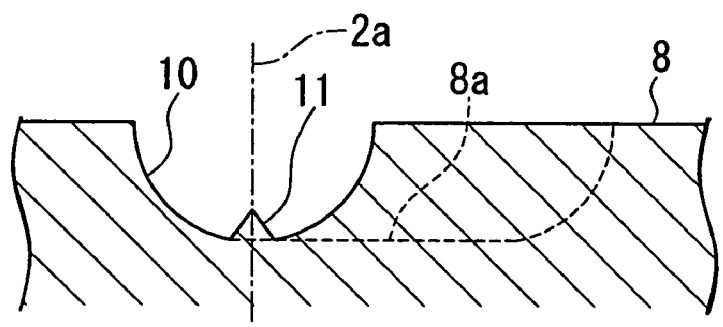
FIG. 4B shows a cross-sectional view of the cutting state of the ball end mill of this invention.

FIG. 3 is a schematic diagram showing the cutting state using the ball end mill seen from the side of the ball end mill according to the embodiment of this invention. FIG. 4A is a schematic diagram showing this cutting state in the side view, and FIG. 4B is a cross-sectional view taken along the line B-B of FIG. 4A.

As shown in FIG. 3, when the ball end mill 1 rotates in the direction indicated by the arrow, the cutting blade 4 cuts the work 8, forming a workface 8a. Then, chips 9 are pushed away to the side of the rake face 5a. Since the rake angle θ$_1$ is a negative angle, a compressive stress acts against the work 8, preventing burrs generated by expansive stress. This obtains a highly precise workface 8a, making the process ideal for finishing cutting and the like. The angle θ$_1$ is set in correspondence with the cutting depth, and is large enough to allow the chips 9 to escape.

FIG. 3 shows cutting on the first cutting blade 4A side; however, when cutting on the second cutting blade 4B side, instead of the rake face 5a, the rake face 6a is positioned on the cutting direction side. This obtains the same advantages as those mentioned above, since the rake angle θ$_2$ is negative, preventing burrs on the workface.

Since the two rake angles are different, in the cutting blade section 3, the first cutting blade 4A and the second cutting blade 4B have asymmetrical cutting resistances of different amount. Therefore, since different excitation forces act on each side of the cutting blade, the ball end mill is prevented from resonating. This enables the face precision to be increased. Since chipping caused by resonance is also prevented, the cutting blade section 3 has a long life, even when it is comprised of a material prone to chipping, such as CBN.

Subsequently, the cutting operation in plan view will be explained with reference to FIGS. 4A and 4B.

As shown in FIG. 4A, when cutting while rotating the ball end mill 1 around the shank axis 2a, the workface formed by the rotation of the cutting blade 4 is a semi spherical face 10 having a radius OP (=OS). Since the cutting blade 4 is continuous and there is no chisel section or the like, the locus of the cutting blade 4 becomes this face 10, enabling the workface to be formed with high precision in accordance with the shape precision of the cutting blade 4. In particular, since the cutting blade 4 is mirror finished, the face 10 is also formed with highly precise smoothness of like a mirror.

On the other hand, since the cutting blade 4 deviates from the shank axis 2a (point O) by a predetermined distance d, a cut residue 11 which is a triangular pyramid-like protrusion having a circle with a radius of OQ (=d) as its bottom face, is formed around the shank axis 2a.

At this time, at any given position on the cutting blade 4, there is a finite radius to the point O, and the cutting blade 4 consequently has a predetermined circumferential speed in the cutting direction. Therefore, it is possible to prevent the cutting blade 4 from suffering heavy abrasion and breakage as a result of increased cutting resistance when the circumferential speed of one part of the cutting blade 4 approaches zero, such as in a case where the rotational axis passes the cutting blade.

The cutting residue 11 is sequentially cut by the cutting blade 4 as the ball end mill 1 moves in the plan direction, and the workface 8a can be made as desired shape e.g. a groove, a flat surface, a curved surface, or the like.

During the cutting operation, due to the deviation of the cutting blade 4, the cutting blade 4 beside the rake face 5a positions backward of the rotational axis, and the cutting blade 4 beside the rake face 6a positions forward of the rotational axis. For this reason, when viewed from a predetermined position on the surface being worked, the rake face 5a arrives before the rake face 6a, or vice versa. This time lapse varies according to the predetermined distance d.

This signifies that, although the cutting blade 4 is straight, the cutting blade 4 acts as a type of cutting blade having edges at unequal interval. In other words, as the cutting blade 4 rotates, a predetermined point on the surface being worked receives the colliding force of in accordance with the number of the edges of the cutting blade during a single rotation, however, resonance is prevented by the deviation of the cycle of the colliding force.

Therefore, the ball end mill 1 has an advantage that, due to the synergism of the asymmetrical cutting resistance already described above and the unequal interval characteristics of the cutting blade, resonance can be more effectively prevented.

In the example described above, the ball end mill 1 rotates in the direction indicated by the arrow in FIG. 1A; however, when rotated in the opposite direction, the flanks 5b and 6b become the rake faces having rake angles of θ$_1$ and θ$_2$ respectively. Therefore, since the cutting effect is the same whether the ball end mill 1 rotates in the forward or reverse directions, this achieves an advantage that the direction of rotation can be freely selected.

Subsequently, test results verifying the abrasion performance of the ball end mill 1 according to the embodiment of this invention will be explained.

Figure 5:
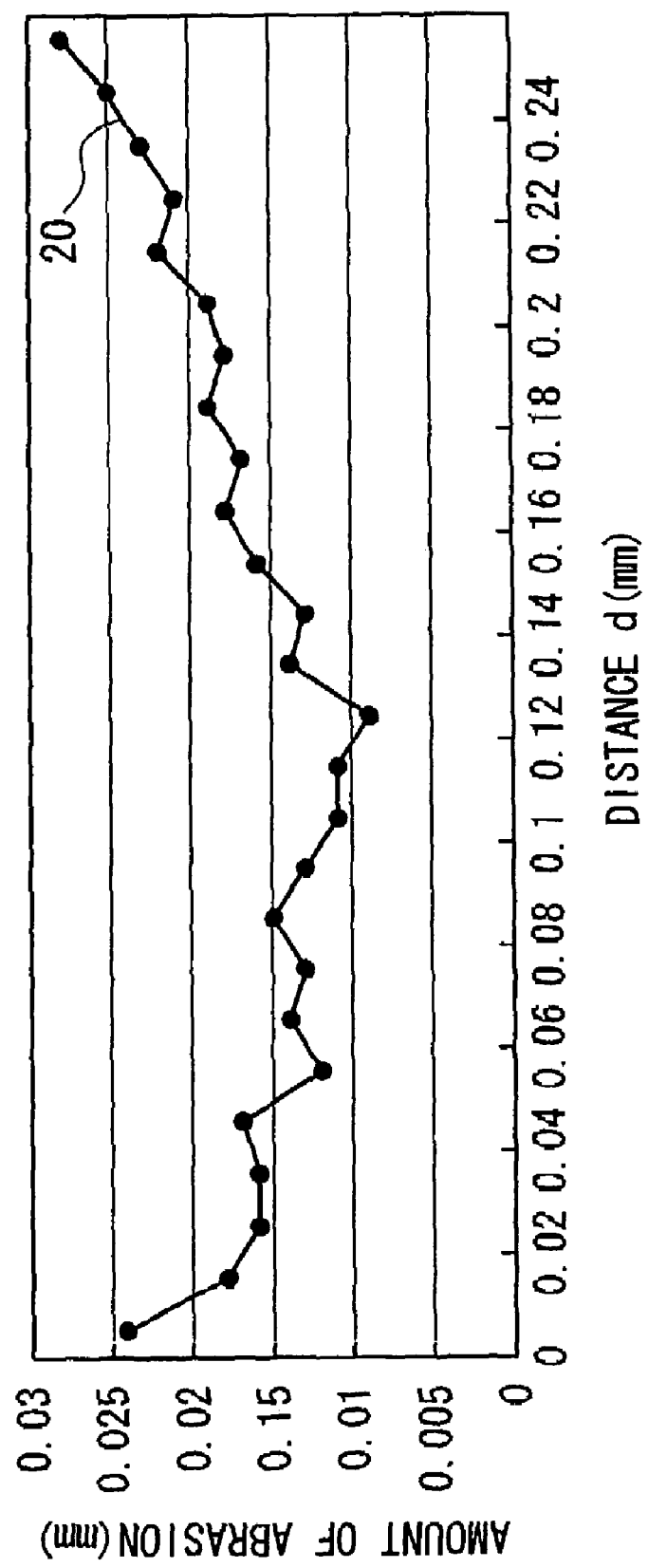
FIG. 5 is a graph of test results showing the abrasion characteristics of the ball end mill according to an embodiment of this invention.

FIG. 5 is a graph of test results showing the abrasion performance of the ball end mill 1 according to the embodiment of this invention. The horizontal axis represents the distance d from the cutting blade 4 to the shank axis 2a in units of millimeters. The vertical axis represents the amount of abrasion after cutting for 2000 mm at the peak 4b of the cutting blade 4, in units of millimeters. The test results are plotted by a jagged line 20.

The ball end mill 1 used in the test has a cutting blade section 3 composed of CBN, the tip radius R of the cutting blade 4 is R=1 mm, i.e. the outer diameter of the cutting blade 4 is 2R=2 mm, and the rounded radius r of the cutting blade 4 is r=5 μm. The amount of abrasion when testing a cutting blade 4 of d=0 mm under identical conditions was 0.025 mm.

Although the jagged line 20 exhibits some variation, its overall tendency resembles a curved line having a protruding bend at the bottom; the amount of abrasion tends to increase when the distance d is small and when it is large. According to these results, the amount of abrasion is no greater than 0.025 mm when 0 mm<d≦0.25 mm. Furthermore, the amount of abrasion is no greater than 0.02 mm when 0.01 mm≦d≦0.2 mm. This amount corresponds to an improvement of 20% compared to the amount when d=0 mm, and shows a marked reduction in the amount of abrasion.

The present inventors repeated the test, and, although the absolute value of the amount of abrasion varied according to conditions, it was confirmed that when the ratio between the distance d and the outer diameter 2R of the cutting blade 4 satisfies $$0<(d/2R)\leq 12\%$$

the amount of abrasion is reduced in comparison with the amount when d=0 mm; and, when the ratio satisfies $$0.5\%\leq(d/2R)\leq 10\%$$

the amount of abrasion is further reduced.

In the explanation above, the cutting blade 4 is a straight cutting blade on a single flat surface. However, if the cutting blade is continuous, it may have a twisted angle. In this case, since the axis of the cutting blade 4 deviates from the shank axis 2a by the distance d, the circumferential speed at its peak 4b is not zero during cutting, and, as a result, abrasion near the peak 4b can be reduced.

Furthermore, the above explanation describes an example where cutting is performed using a semi-circular cutting blade 4a. However, similar advantages are obtained in the case where the cutting blade 4 is more deeply cut and cutting is performed using the outer peripheral cutting blade 4c, since the difference being only in the shapes of the cutting blade 4.

What is claimed is:

1. A ball end mill comprising:
   a tool main body which rotates around a rotational axis thereof;
   a cutting blade section provided at a tip of the tool main body;
   a cutting blade which is formed at a tip of the cutting blade section, and has a substantially semi-circular shape; and
   a rake face and a flank, which are provided on either side of the cutting blade wherein;
   the cutting blade is disposed on a flat face parallel to the rotational axis; and
   the flat face is shifted from the rotational axis by a predetermined distance when the flat face is viewed along the rotational axis.

2. The ball end mill according to claim 1, wherein the predetermined distance is the length within a range of 0.5% to 10% of the outer diameter of the cutting blade.

3. The ball end mill according to claim 1, wherein:
   a blade face having the rake face and the flank formed continuously with each other is formed on each side of the cutting blade; and
   rake angles of the rake faces on each side of the cutting blade are different to each other.

4. The ball end mill according to claim 2, wherein:
   a blade face having the rake face and the flank formed continuously with each other is formed on each side of the cutting blade; and
   rake angles of the rake faces on each side of the cutting blade are different to each other.

5. The ball end mill according to claim 1, wherein a rake angle of the rake face is a negative angle.

6. The ball end mill according to claim 1, wherein the cutting blade is slightly rounded by mirror polishing.

* * * * *